(12) United States Patent
Ohta

(10) Patent No.: US 11,509,827 B2
(45) Date of Patent: Nov. 22, 2022

(54) VIBRATION RELIABILITY CALCULATION APPARATUS, VIBRATION RELIABILITY CALCULATION METHOD, AND COMPUTER READABLE RECORDING MEDIUM

(71) Applicant: NEC Corporation, Tokyo (JP)

(72) Inventor: Masahiko Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 146 days.

(21) Appl. No.: 16/964,421

(22) PCT Filed: Jan. 23, 2018

(86) PCT No.: PCT/JP2018/001923
§ 371 (c)(1),
(2) Date: Jul. 23, 2020

(87) PCT Pub. No.: WO2019/145992
PCT Pub. Date: Aug. 1, 2019

(65) Prior Publication Data
US 2021/0051270 A1   Feb. 18, 2021

(51) Int. Cl.
*H04N 5/232* (2006.01)
*G06T 7/246* (2017.01)
*G06K 9/62* (2022.01)
*G06V 10/75* (2022.01)

(52) U.S. Cl.
CPC ....... *H04N 5/23254* (2013.01); *G06K 9/6215* (2013.01); *G06T 7/248* (2017.01); *G06V 10/75* (2022.01); *G06V 10/751* (2022.01); *H04N 5/23222* (2013.01)

(58) Field of Classification Search
None
See application file for complete search history.

(56) References Cited

U.S. PATENT DOCUMENTS

| 2008/0101722 A1 | 5/2008 | Bryll et al. |
| 2011/0229056 A1 | 9/2011 | Robertson et al. |
| 2020/0348168 A1* | 11/2020 | Nakano ..................... G06T 7/97 |

FOREIGN PATENT DOCUMENTS

| JP | H11-63975 A | 3/1999 |
| JP | 2003-156389 A | 5/2003 |
| JP | 2005-283440 A | 10/2005 |
| JP | 2008-116456 A | 5/2008 |

(Continued)

OTHER PUBLICATIONS

International Search Report for PCT Application No. PCT/JP2018/001923, dated Apr. 3, 2018.

(Continued)

*Primary Examiner* — Twyler L Haskins
*Assistant Examiner* — Fayez A Bhuiyan
(74) *Attorney, Agent, or Firm* — Sughrue Mion, PLLC

(57) ABSTRACT

A vibration reliability calculation apparatus 10 is provided with an image acquisition unit 11 that acquires time-series images of an object that are output by an image capturing apparatus that shoots the object, and a reliability calculation unit 12 that calculates, for a vibration waveform of the object that is derived from a result of comparing one image and another image that constitute the acquired time-series images, a reliability level indicating a reliability of the vibration waveform.

9 Claims, 7 Drawing Sheets

(56) References Cited

FOREIGN PATENT DOCUMENTS

| | | |
|---|---|---|
| JP | 2015-166728 A | 9/2015 |
| JP | 2015-175827 A | 10/2015 |
| WO | 2017/179535 A1 | 10/2017 |

OTHER PUBLICATIONS

Japanese Office Action for JP Application No. 2019-567423 dated Jun. 1, 2021 with English Translation.
English translation of Written opinion for PCT Application No. PCT/JP2018/001923, dated Apr. 3, 2018.

* cited by examiner

VIBRATION RELIABILITY CALCULATION APPARATUS, VIBRATION RELIABILITY CALCULATION METHOD, AND COMPUTER READABLE RECORDING MEDIUM

This application is a National Stage Entry of PCT/JP2018/001923 filed on Jan. 23, 2018, the contents of all of which are incorporated herein by reference, in their entirety.

TECHNICAL FIELD

The present invention relates to a vibration reliability calculation apparatus, a vibration measurement apparatus provided therewith and a vibration reliability calculation method that are for calculating a reliability level for vibration of an object measured by image-based measurement, and further relates to a computer readable recording medium including a program recorded thereon for realizing the apparatuses and method.

BACKGROUND ART

Heretofore, technologies for measuring mechanical vibration of an object from a remote location have been proposed. According to such technologies, attachment and removal of sensors for vibration detection is no longer necessary and efficient vibration measurement becomes possible, and thus there is demand particularly in fields such as maintenance management and anomaly detection of infrastructure such as bridges, roads, buildings and facilities.

For example, Patent Document 1 discloses a vibration measurement apparatus that uses an image capturing apparatus. The vibration measurement apparatus disclosed in Patent Document 1 acquires time-series images of an object from the image capturing apparatus, derives a displacement distribution of the surface of the object from the acquired time-series images, and measures vibration of the object based on the derived displacement distribution.

Patent Document 2 discloses a vibration measurement apparatus that is also provided with a distance measurement apparatus such as a laser range finder or an ultrasonic range finder, in addition to an image capturing apparatus, in order to also measure the vibration component in an optic axis direction of the image capturing apparatus, in addition to the vibration component in two-dimensional directions within an image. According to the vibration measurement apparatus disclosed in Patent Document 2, since the vibration component in the optic axis direction of the image capturing apparatus can also be measured by the distance measurement apparatus, in addition to the vibration component in two-dimensional directions within an image, vibration of an object in three-dimensional directions can be measured.

Incidentally, since the measured value is not measured directly in the case of mechanical vibration of an object measured by non-contact method in this manner, there are calls to guarantee how reliable the measured value is using a technique of some sort. Although it is generally difficult to evaluate the reliability of a vibration waveform, Patent Document 3, which focuses on this point, proposes a technology that calculates a reliability level, which is a value indicating the reliability of a vibration waveform measured by a non-contact vibration sensor at a measurement point, based on the distance from the measurement point to a measurement target point on the object. According to the technology disclosed in Patent Document 3, it conceivably becomes possible to evaluate the reliability level of a vibration waveform obtained by such non-contact vibration measurement.

LIST OF RELATED ART DOCUMENTS

Patent Document

Patent Document 1: Japanese Patent Laid-Open Publication No. 2003-156389
Patent Document 2: Japanese Patent Laid-Open Publication No. 2005-283440
Patent Document 3: Japanese Patent Laid-Open Publication No. 2015-166728

SUMMARY OF INVENTION

Problems to be Solved by the Invention

However, even using the technology disclosed in Patent Document 3, there are case where the reliability level cannot be adequately evaluated, particularly in the case of performing non-contact vibration measurement using images. For example, in the case where an image includes a region in which local deformation such as cracking occurs when a load is applied, the movement and displacement component of the surface due to the local deformation will also be measured as vibration, unlike the case where an image constituted by only regions in which there is no local deformation is obtained. A region that contains local deformation would thus be expected to have a lower reliability level than a region that does not contain local deformation, but, in the case of using the technology disclosed in Patent Document 3, the degrees of reliability of both regions will be the same if the distances from measurement points of both regions are the same.

An example object of the invention is to provide a vibration reliability calculation apparatus, a vibration reliability calculation method and a computer readable recording medium that solve the abovementioned problems, and can, in non-contact measurement of a vibration waveform, particularly measurement of the vibration waveform of an object using images, evaluate the reliability of the vibration waveform, even in the case where reliability cannot be adequately evaluated with conventional techniques.

Means for Solving the Problems

A vibration reliability calculation apparatus according to an example aspect of the invention includes:
an image acquisition unit configured to acquire time-series images of an object that are output by an image capturing apparatus that shoots the object; and
a reliability calculation unit configured to calculate, for a vibration waveform of the object that is derived from a result of comparing one image and another image that constitute the acquired time-series images, a reliability level indicating a reliability of the vibration waveform.

Also, a vibration reliability calculation method according to an example aspect of the invention includes:
(a) a step of acquiring time-series images of an object that are output by an image capturing apparatus that shoots the object; and
(b) a step of calculating, for a vibration waveform of the object that is derived from a result of comparing one image and another image that constitute the acquired time-series images, a reliability level indicating a reliability of the vibration waveform.

Furthermore, a computer readable recording medium according to an example aspect of the invention includes a program recorded thereon, the program including instructions that cause a computer to carry out:

(a) a step of acquiring time-series images of an object that are output by an image capturing apparatus that shoots the object; and (b) a step of calculating, for a vibration waveform of the object that is derived from a result of comparing one image and another image that constitute the acquired time-series images, a reliability level indicating a reliability of the vibration waveform.

Advantageous Effects of the Invention

As described above, according to the invention, in non-contact measurement of a vibration waveform, particularly measurement of the vibration waveform of an object using images, the reliability of the vibration waveform can be evaluated, even in the case where reliability cannot be adequately evaluated with conventional techniques.

EXAMPLE EMBODIMENTS

First Example Embodiment

Hereinafter, a vibration reliability calculation apparatus, a vibration reliability calculation method and a program in a first example embodiment of the invention will be described with reference to FIGS. 1 to 3.

[Apparatus Configuration]

Initially, the configuration of the vibration reliability calculation apparatus in the first example embodiment will be described using FIG. 1. FIG. 1 is a block diagram showing a schematic configuration of the vibration reliability calculation apparatus in the first example embodiment of the invention.

Figure 1:
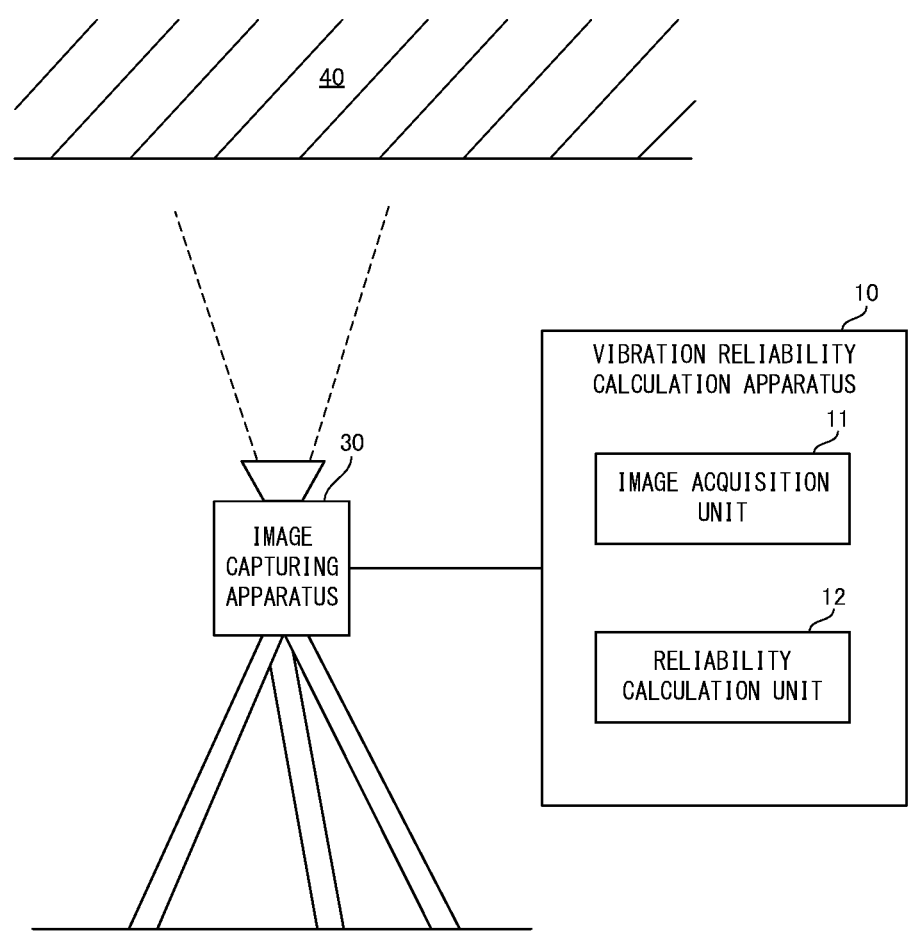
FIG. 1 is a block diagram showing a schematic configuration of a vibration reliability calculation apparatus in a first example embodiment of the invention.

A vibration reliability calculation apparatus 10 in the first example embodiment shown in FIG. 1 is an apparatus that calculates a reliability level for the vibration of an object 40 that is derived from time-series images of the object. Also, as shown in FIG. 1, the vibration reliability calculation apparatus 10 is provided with an image acquisition unit 11 and a reliability calculation unit 12.

The image acquisition unit 11 acquires time-series images of the object 40 output by an image capturing apparatus 30 that shoots the object. The reliability calculation unit 12 calculates a reliability level indicating the reliability of a vibration waveform of the object that is derived from a comparison of one image and another image that constitute the acquired time-series images. Also, the reliability level is, in other words, a value indicating the extent to which the value of measured vibration is reliable.

In this way, in the first example embodiment, the reliability level can be calculated for a vibration waveform derived from time-series images. As a result, according to the present example embodiment, in non-contact measurement of a vibration waveform, particularly measurement of the vibration waveform of an object using images, the reliability of the vibration waveform can be evaluated, even in the case where reliability cannot be adequately evaluated with conventional techniques.

Next, the configuration of the vibration reliability calculation apparatus in the first example embodiment will be described more specifically using FIG. 2 in addition to FIG. 1. FIG. 2 is a block diagram showing a detailed configuration of the vibration reliability calculation apparatus in the first example embodiment of the invention.

Figure 2:
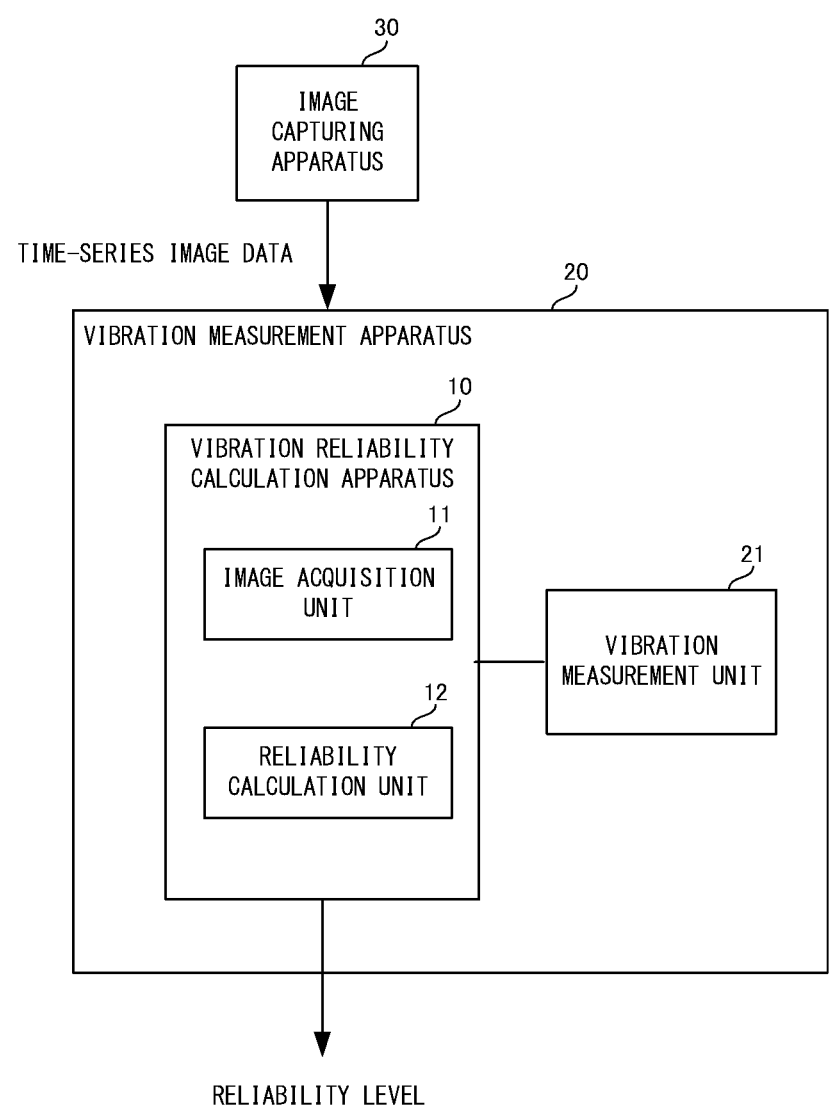
FIG. 2 is a block diagram showing a detailed configuration of the vibration reliability calculation apparatus in the first example embodiment of the invention.

As shown in FIG. 2, the vibration reliability calculation apparatus 10 in the first example embodiment constitutes part of a vibration measurement apparatus 20. Also, as shown in FIG. 1, the vibration measurement apparatus 20 is connected to the image capturing apparatus 30 that shoots the object 40. Specifically, the image capturing apparatus 30 is disposed in a region separated from the object 40 such as on the ground, for example, so that a measurement target region on the object 40 can be shot. Also, the image capturing apparatus 30 outputs shot images of the measurement target region at a set interval. The image acquisition unit 11 receives images output thereto as needed, and acquires these images as time-series images.

Also, in the first example embodiment, infrastructure such as bridges, roads, buildings and facilities is given as the object 40. Also, in the case where the object 40 is a bridge, for example, a predetermined region of the undersurface of a beam, floor slab or the like of the bridge is given as the measurement target region.

Furthermore, in the first example embodiment, the object 40 is not limited to infrastructure, and need only be an object that is accompanied by motion and vibration in three-dimensional directions. In addition, the measurement target region is a region perpendicular to the vertical direction, such as the abovementioned undersurface of a beam, floor slab or the like of a bridge in the example in FIG. 1 but is not limited thereto and may be a region parallel to the vertical direction (e.g., a region of a lateral surface of a railing of a bridge, etc.) or a region oblique to the vertical direction (e.g., a region of an undersurface of a lamp part of a bridge, etc.).

Also, as shown in FIG. 2, the vibration measurement apparatus 20 is provided with a vibration measurement unit 21, in addition to the vibration reliability calculation apparatus 10. The vibration measurement unit 21 measures the vibration waveform of the object 40, using the time-series images acquired by the image acquisition unit 11. More specifically, the vibration measurement unit 21 measures the vibration waveform of the object 40, based on a movement amount of a specific region within each image that is obtained by comparing one image and another image that constitute the time-series images.

Here, the functions of the vibration measurement unit 21 will be described in greater detail. First, in the first example embodiment, as shown in FIG. 1, the image capturing apparatus 30 is disposed such that the shooting direction is parallel to the vertical direction and the light receiving surface is parallel to the measurement target region.

That is, the image capturing apparatus 30 is disposed such that the normal of the light receiving surface of a solid-state image sensor constituting the image capturing apparatus 30 is parallel to the normal of the measurement target region, and two-dimensional directions within the shot time-series images (horizontal direction of time-series images and vertical direction of time-series images) are parallel to a plane direction of the measurement target region. The plane direction of the measurement target region referred to here means a direction parallel to a plane constituted by the measurement target region of the object 40. The horizontal direction of the time-series images is an X-direction, the vertical direction of the time-series images is a Y-direction, and the normal direction (vertical direction) of the measurement target region is a Z-direction.

The vibration measurement unit 21, in the first example embodiment, acquires the time-series images that are output by the image capturing apparatus 30, and takes an image captured at a given time as a reference image and the remaining images as processing images. The vibration measurement unit 21 then, for every processing image, finds a specified region (hereinafter, "specific region") that includes a region of interest on the reference image, that is, the measurement target region within the image, and calculates a displacement ($d1x$, $d1y$) in the plane direction.

Specifically, the vibration measurement unit 21 first collates the processing images with the reference image, and, for every processing image, specifies the position of the measurement target region that is most highly collated. Also, the vibration measurement unit 21 calculates the specified position as the displacement $d1x$ in the X-direction and the displacement $d1y$ in the Y-direction. Techniques for finding the most highly correlated position (coordinates) using a similarity correlation function such as SAD (Sum of Absolute Difference), SSD (Sum of Squared Difference), NCC (Normalized Cross-Correlation) or ZNCC (Zero-means Normalized Cross-Correlation), for example, are given as techniques for finding the most highly collated measurement target region.

Fitting can also be used as a technique for finding the most highly collated measurement target region. With this method, the position (coordinates) of a similar region can be more accurately calculated with subpixel accuracy. Specifically, after finding the most highly collated location (coordinates), the similarity correlation functions of positions (coordinates) in all directions around the found location (coordinates) are calculated. Thereafter, a technique such as straight line fitting, curve fitting or parabola fitting is applied, using the calculated similarity correlation functions of the respective coordinates, and the most highly collated position among the coordinates is found. The position (coordinates) of a similar region can thereby be specified with subpixel accuracy.

Also, the vibration measurement unit 21 creates an image group (hereinafter, "reference image group") by enlarging and reducing the reference image by scale factors determined in advance, in order to calculate a displacement $d1z$ of the specific region in the normal direction. At this time, the vibration measurement unit 21 sets a center position of the enlarged and reduced images of the reference image, based on the displacement ($d1x$, $d1y$) in the plane direction previously calculated, and creates the reference image group.

Then, the vibration measurement unit 21, for every processing image, collates the enlarged and reduced images, and specifies the enlarged or reduced image that is most highly collated. Specification of the most highly collated image can be performed using a similarity correlation function previously mentioned such as SAD, SSD, NCC or ZNCC, for example. The vibration measurement unit 21 then specifies the image with the highest similarity, that is, a highly correlated image, from among the images constituting the reference image group, and calculates the enlargement factor or reduction factor (hereinafter, "scale factor") of the specified image as an amount ($d1z$) indicating the displacement of the specific region in the normal direction.

Also, the vibration measurement unit 21, after specifying the most highly collated image, selects the images having a scale factor on either side of the specified image from the reference image group, and calculates the similarity correlation functions of the specified image and the selected images. The vibration measurement unit 21 is then also able to calculate the scale factor for achieving an amount ($d1z$) indicating the displacement in the normal direction, by applying a technique such as straight line fitting or curve fitting, using the calculated similarity correlation functions. The scale factor ($d1z$) can thereby be calculated more accurately as an amount indicating the displacement in the normal direction. The displacement ($d1x$, $d1y$) of the specific region for every processing image and the scale factor ($d1z$) as an amount indicating the displacement in the normal direction are thus calculated.

Also, the vibration measurement unit 21 is able to execute the abovementioned processing a plurality of times, in order to enhance the accuracy of the displacement. Specifically, the vibration measurement unit 21, with consideration for the influence of the scale factor $d1z$ previously calculated by the vibration measurement unit 21, selects the image corresponding to the scale factor $d1z$ from among the images constituting the reference image group, and takes the selected image as a new reference image. Next, the vibration measurement unit 21 contrasts the processing images with the new reference image, specifies a similar location that is most similar to the new reference image in the processing images, derives the position of the specified location, and detects a displacement ($d2x$, $d2y$) of the similar location.

Next, the vibration measurement unit 21 sets a center position of an enlargement or reduction of each image constituting the reference image group, based on the newly detected displacement ($d2x$, $d2y$), and creates a new reference image group. The vibration measurement unit 21 then calculates the similarity between the processing images and each image constituting the new reference image group, and specifies the image with the highest similarity among the images constituting the new reference image group. Thereafter, the vibration measurement unit 21 calculates the scale factor of the specified image as an amount ($d2z$) indicating the displacement of the specific region in the normal direction.

In this way, in the first iteration of processing, the displacement ($d1x$, $d1y$) is calculated in a state where $d1z$, which is the scale factor indicating the displacement in the normal direction, is not taken into consideration, whereas, in the second iteration of processing, the displacement (d2x, d2y) is calculated in a state where the scale factor d1z is taken into consideration. The displacement (d2x, d2y) calculated in the second iteration of processing is thus calculated with high accuracy, compared with the displacement calculated in the first iteration. Also, in the case where similar processing is executed a plurality of times, the accuracy of the displacement will further improve.

Note that, in the abovementioned example, the processing is repeated twice, but is not particularly limited thereto. The number of repetitions may be set in advance, or may be set as appropriate according to the result. Also, a mode in which the processing is repeated until the value of the calculated displacement reaches a threshold value may be adopted.

Also, in the subsequent description, the displacement that is ultimately obtained with a certain processing image is represented by a displacement (dnx, dny) and a scale factor (dnz) which is an amount indicating the displacement in the normal direction. The result of similarly calculating displacement for the time-series images can be treated as a value that changes over time, and is thus denoted as a displacement (dnx(t), dny(t)) and a scale factor (dnz(t)).

Furthermore, the vibration measurement unit 21 calculates a movement amount ($\Delta$x, $\Delta$y) of the measurement target region on the object 40 in the plane direction, based on the displacement of the specific region in the plane direction and shooting information of the image capturing apparatus 30. Next, the vibration measurement unit 21 also calculates a movement amount $\Delta$z of the measurement target region on the object 40 in the normal direction, based on the displacement of the specific region in the normal direction and the distance from the image capturing apparatus 30 to the object 40.

Specifically, the displacement (dnx(t), dny(t)) of the specific region in the plane direction is calculated in pixel units. Accordingly, the vibration measurement unit 21, as shown in the following equations 1 and 2, calculates the movement amount ($\Delta$x, $\Delta$y) [mm] respectively in the X-direction and Y-direction, using the length per pixel (Dx, Dy) [mm/pixel] of the image sensor of the image capturing apparatus 30 respectively in the X-direction and Y-direction. Also, the length per pixel (Dx, Dy) [mm/pixel] of the image sensor can be calculated from the following equations 3 and 4, using a pixel pitch (px, py) [mm] of the image sensor, a focal length f [mm] of the lens, and a distance L [mm] from a principal point of the lens to the measurement target region.

$\Delta x = Dx \cdot dnx(t)$ [Equation 1]

$\Delta y = Dy \cdot dny(t)$ [Equation 2]

$Dx = px \cdot (L/f)$ [Equation 3]

$Dy = py \cdot (L/f)$ [Equation 4]

Also, the displacement of the specific region in the normal direction is calculated as a scale factor. Accordingly, the vibration measurement unit 21, as shown in the following equation 5, calculates the movement amount $\Delta$z [mm] in the Z-direction (normal direction), using the distance L [mm] from the principal point of the image sensor to the specific region.

$\Delta z = L \cdot dnz(t)$ [Equation 5]

The movement amount ($\Delta$x, $\Delta$y, $\Delta$z) of the measurement target region obtained in this way is obtained for every frame of the time-series images that are shot. Therefore, each movement amount obtained for every time-series image represents a vibration waveform (vibration component) of the measurement target region whose sampling interval is the reciprocal of the shooting framerate. Each movement amount obtained for every time-series image calculated by the vibration measurement unit 21 can thus be treated as a vibration waveform of the measurement target region for each of the X-direction, Y-direction and Z-direction.

Also, in the first example embodiment, the reliability calculation unit 12 calculates a reliability level for the vibration waveform measured by the vibration measurement unit 21, based on the similarity between the specific region in one image and the specific region in another image.

Specifically, the reliability calculation unit 12 is able to calculate the reliability level, using the similarity correlation functions derived when the displacement in the X-direction and Y-direction is calculated by the vibration measurement unit 21 and the similarity correlation functions derived when the displacement in the Z-direction is calculated.

For example, in the case where the value of the similarity correlation function SAD or SSD is small, the similarity between the processing image and the reference image is high, and thus it is conceivable that only the movement amount ($\Delta$x, $\Delta$y, $\Delta$z) calculated from the displacement has occurred in the object 40. Therefore, in this case, the reliability calculation unit 12 calculates the reliability level to have a high value.

On the other hand, in the case where the value of the similarity correlation function SAD or SSD is large, the similarity between the processing image and the reference image is low, and thus it is conceivable that deformation or the like other than the movement amount ($\Delta$x, $\Delta$y, $\Delta$z) calculated from the displacement has occurred in the object 40. Therefore, in this case, the reliability calculation unit 12 calculates the reliability level to have a low value.

Note that, with the similarity correlation functions derived when calculating the displacement in the X-direction and Y-direction and the similarity correlation functions derived when calculating the displacement in the Z-direction, the former tends to be more readily affected compared with the latter, in the case where deformation or the like other than the movement amount ($\Delta$x, $\Delta$y, $\Delta$z) calculated from the displacement occurs in the object 40. Accordingly, a more accurate reliability level can be calculated, by weighting the similarity correlation functions derived when calculating the displacement in the X-direction and Y-direction.

[Apparatus Operations]

Next, operations of the vibration reliability calculation apparatus 10 in the first example embodiment of the invention will be described using FIG. 3. FIG. 3 is a flow diagram showing operations of the vibration reliability calculation apparatus in the first example embodiment of the invention. In the following description, FIGS. 1 and 2 will be referred to as appropriate. Also, in the first example embodiment, the vibration reliability calculation method is implemented by operating the vibration reliability calculation apparatus 10. Therefore, the following description of the operations of the vibration reliability calculation apparatus 10 will be given in place of a description of the vibration reliability calculation method in the first example embodiment.

Figure 3:
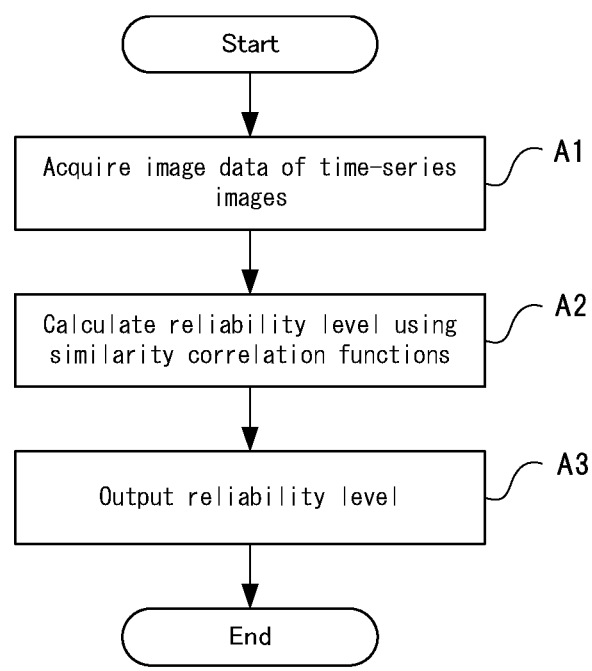
FIG. 3 is a flow diagram showing operations of the vibration reliability calculation apparatus in the first example embodiment of the invention.

As shown in FIG. 3, initially, in the vibration reliability calculation apparatus 10, the image acquisition unit 11 acquires the image data of time-series images shot of the measurement target region of the object 40 that is output by the image capturing apparatus 30 (step A1).

Upon step A1 being executed, the vibration measurement unit 21, in the vibration measurement apparatus 20, calculates the displacement (d1x, d1y) of a specific region which is a region including the measurement target region within the image data in the plane direction, using the image data of the time-series images acquired in step A1. The vibration measurement unit 21 also calculates the displacement d1z of the specific region in the normal direction, from the image data of the time-series images and the displacement of the specific region in the plane direction.

Furthermore, the vibration measurement unit 21 derives the movement amount of the object 40 in each direction, that is, the vibration waveform of the object 40, from the displacement of the specific region in the plane direction and the displacement of the specific region in the normal direction for every processing image in the time-series images.

Next, upon the vibration waveform being derived by the vibration measurement unit 21, the reliability calculation unit 12 calculates the reliability level, using the similarity correlation functions derived when the displacement in the plane direction is calculated by the vibration measurement unit 21 and the similarity correlation functions derived when the displacement in the normal direction is calculated (step A2).

Next, the reliability calculation unit 12 externally outputs the reliability level calculated in step A2 (step A3). As a result, the calculated reliability level is, for example, displayed on the screen of a display device that is connected to the vibration measurement apparatus 20.

As described above, in the first example embodiment, the reliability level is calculated for the vibration waveform derived from the time-series images by the vibration measurement apparatus 20, and the result is presented to the user of the vibration measurement apparatus 20. The user is thus able to evaluate the reliability of the vibration waveform, based on the presented reliability level.

[Program]

The program in the first example embodiment need only be a program that causes a computer to execute steps A1 to A3 shown in FIG. 3. The vibration reliability calculation apparatus 10 and the vibration reliability calculation method in the first example embodiment can be realized by this program being installed on a computer and executed. In this case, a processor of the computer performs processing while functioning as the image acquisition unit 11 and the reliability calculation unit 12.

Also, the program in the first example embodiment may be executed by a computer system built from a plurality of computers. In this case, for example, the computers may each function as one of the image acquisition unit 11 and the reliability calculation unit 12.

Second Example Embodiment

Next, a vibration reliability calculation apparatus, a vibration reliability calculation method and a program in a second example embodiment of the invention will be described with reference to FIGS. 4 to 6.

[Apparatus Configuration]

Initially, the configuration of the vibration reliability calculation apparatus in the second example embodiment will be described. Note that the vibration reliability calculation apparatus in the second example embodiment has a similar configuration to the vibration reliability calculation apparatus 10 shown in FIGS. 1 and 2, and only the processing in the reliability calculation unit 12 differs. The following description will thus focus on the differences from the first example embodiment, with reference to FIGS. 1 and 2.

First, in the second example embodiment, similarly to the first example embodiment, the vibration reliability calculation apparatus constitutes part of a vibration measurement apparatus 20. The vibration measurement apparatus 20 is provided with a vibration measurement unit 21, in addition to the vibration reliability calculation apparatus 10. In the second example embodiment, however, the vibration measurement unit 21 measures the vibration waveform of the object 40, using the displacement distribution on the surface of the object 40 derived from time-series images.

Here, the functions of the vibration measurement unit 21 will be described in greater detail. The vibration measurement unit 21, first, in the second example embodiment, similarly acquires time-series images that are output by the image capturing apparatus 30, and takes an image captured at a given time as a reference image and the remaining images as processing images. The vibration measurement unit 21 then calculates the displacement by respectively finding, for each point of a specific region within the reference image, a corresponding position within the processing images. By repeating this for every processing image, the distribution of the displacement for the specific region is calculated for every processing image.

Specifically, the vibration measurement unit 21, similarly to the first example embodiment, calculates the displacement of a specified location (coordinates), by finding a location (coordinates) in the processing images that is most similar to a certain location (coordinates) within the specific region of the reference image, using similarity correlation functions.

Also, by repeatedly implementing such calculation processing on respective coordinates within the specific region, the distribution of the displacement for the specific region in that processing image can be obtained. Also, by performing similar processing for every processing image, the displacement distribution for the specific region can be obtained for every processing image.

Next, the vibration measurement unit 21 calculates the movement amount ($\Delta x$, $\Delta y$) of the measurement target region in the plane direction and the movement amount ($\Delta z$) of the measurement target region in the normal direction, from the calculated displacement distribution and the shooting information. The shooting information is similar to the shooting information described in the first example embodiment.

Before giving a detailed description of the operations of the vibration measurement unit 21, the types of displacement components that are included in the displacement calculated by the vibration measurement unit 21 will be described using FIG. 4. FIG. 4 is a diagram illustrating the components included in the displacement that is observed on the image capturing surface of the image capturing apparatus 30 at a certain point, when the measurement target region of a structure is shot.

Figure 4:
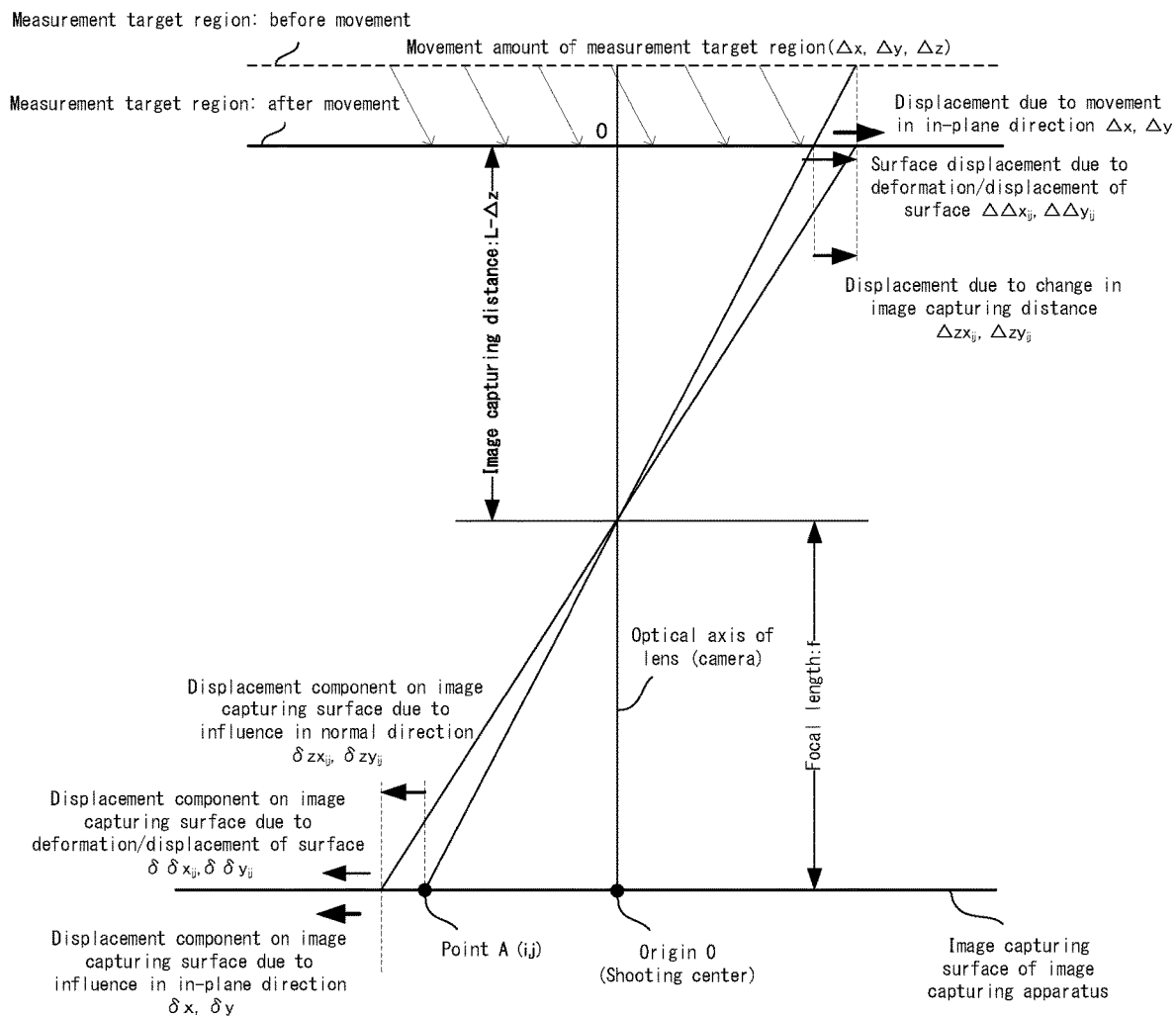
FIG. 4 is a diagram illustrating components included in displacement that is observed at a certain point on an image capturing surface of an image capturing apparatus 30, when a measurement target region of a structure is shot.

FIG. 4 shows a state where the measurement target region has moved by the movement amount ($\Delta x$, $\Delta y$, $\Delta z$) in three-dimensional directions, before and after a bridge serving as the object 40 moves in response to a load or some sort. Here, a coordinate system whose origin is the center of the image capturing surface of the image capturing apparatus 30, that is, the point corresponding to the image capturing center at which the optic axis of the lens intersects the image capturing surface, will be considered. In this coordinate system, a displacement ($\delta x_{ij}$, $\delta y_{ij}$) that is observed at a point A of coordinates (i, j) on the image capturing surface of the image capturing apparatus 30 will be considered. Note that the displacement may be considered after replacing the coordinates (i, j) on the image capturing surface of the image capturing apparatus 30 with coordinates on the shot image.

In the state in FIG. 4, the movement amount ($\Delta x$, $\Delta y$, $\Delta z$) has occurred in the horizontal direction and vertical direction (X and Y-directions) on the screen and the normal direction (Z-direction), in the measurement target region of the object 40. The measurement target region moves parallel to the image capturing surface of the image capturing apparatus 30, by the portion ($\Delta x$, $\Delta y$) moved in the horizontal direction and vertical direction (X and Y-directions) within the screen. Also, the measurement target region approaches the image capturing apparatus 30 by the portion ($\Delta z$) moved in the normal direction (Z-direction). Thus, the image capturing distance is shorten by the movement amount $\Delta z$.

As such, as shown in FIG. 4, the displacement $\delta z x_{ij}$ due to the movement amount $\Delta z$ occurs, separately to the displacement $\delta x$ that occurs due to the movement amount $\Delta x$ of the measurement target region in a horizontal direction (X-direction) with respect to the image capturing surface of the image capturing apparatus 30. Similarly, on the image capturing surface of the image capturing apparatus 30, the displacement $\delta z y_{ij}$ due to the movement amount $\Delta z$ also occurs, separately to the displacement $\delta y$ that occurs due to the movement amount $\Delta y$ of the image capturing apparatus 30 in the vertical direction (Y-direction) with respect to the screen.

Also, in the case where deformation or displacement ($\Delta\Delta x_{ij}$, $\Delta\Delta y_{ij}$) occurs on the surface of the measurement target region due to the object 40 being subjected to a load of some sort, a surface displacement component ($\delta\delta x_{ij}$, $\delta\delta y_{ij}$) is also superimposed on the image capturing surface of the image capturing apparatus 30 as a consequence. Here, with the surface displacement component ($\delta\delta x_{ij}$, $\delta\delta y_{ij}$) accompanying deformation and displacement of the surface of the measurement target region, for example, the surface displacement changes continuously in a region that is in good condition without defects such as cracks, whereas the surface displacement changes discontinuously rather than continuously in a region that is filled with cracks. In this way, regions in good condition without defects and regions having defects of some sort are characterized by differing distributions of surface displacement.

These displacement components are all independently added together, and observed in the form of a composite vector. That is, as shown in FIG. 4 described later, the displacement ($\delta x_{ij}$, $\delta y_{ij}$) that is observed at the point A can be represented by the following equations 6 and 7.

($\delta x_{ij}$, $\delta y_{ij}$)=[displacement component ($\delta x$, $\delta y$) accompanying movement ($\Delta x$, $\Delta y$) in plane direction]+
[displacement component ($\delta z x_{ij}$, $\delta z y_{ij}$) accompanying movement ($\Delta z$) in normal direction]+
[surface displacement component ($\delta\delta x_{ij}$, $\delta\delta y_{ij}$)]  [Equation 6]

($\delta x_{ij}$, $\delta y_{ij}$)=($\delta x$+$\delta z x_{ij}$+$\delta\delta x_{ij}$, $\delta y$+$\delta z y_{ij}$+$\delta\delta y_{ij}$)  [Equation 7]

Here, the displacement component ($\delta x$, $\delta y$) accompanying the movement ($\Delta x$, $\Delta y$) of the object 40 in the plane direction and the displacement component ($\delta z x_{ij}$, $\delta z y_{ij}$) accompanying the movement ($\Delta z$) in the normal direction are respectively represented by the following equations 8 and 9, where L is the image capturing distance from the principal point of the lens to the measurement target region, f is the lens focal length of the image capturing apparatus 30, and (i, j) are the coordinates from the image capturing center.

$$(\delta x, \delta y) = \left(\frac{f}{L-\Delta z}\Delta x, \frac{f}{L-\Delta z}\Delta y\right) \quad \text{[Equation 8]}$$

$$(\delta z x_{ij}, \delta z y_{ij}) = \left(f\left(\frac{1}{L-\Delta z} - \frac{1}{L}\right)i, f\left(\frac{1}{L-\Delta z} - \frac{1}{L}\right)j\right) \quad \text{[Equation 9]}$$

Assuming that the measurement target regions all exhibit the same three-dimensional motion, it is evident that the displacement component ($\delta x$, $\delta y$) accompanying the movement ($\Delta x$, $\Delta y$) in the plane direction indicated by the above equations 8 and 9 is constant regardless of the coordinates of the point A. Also, it is evident that the displacement component ($\delta z x_{ij}$, $\delta z y_{ij}$) accompanying the movement ($\Delta z$) in the normal direction is larger as the coordinates of the point A are distanced further from the origin. On the other hand, the surface displacement component ($\delta\delta x_{ij}$, $\delta\delta y_{ij}$) of the measurement target region exhibits a distribution of continuous or discontinuous displacement according to the position of defects such as cracks in the surface, regardless of the coordinates of the point A.

Next, the operations of the vibration measurement unit 21 in the second example embodiment will be described in detail using FIG. 5. FIG. 5 is a diagram showing, in a simulated manner, a two-dimensional spatial distribution (hereinafter, displacement distribution) of the displacement component ($\delta x_{ij}$, $\delta y_{ij}$) that is observed in a specific region on an image shot of the measurement target region.

Figure 5:
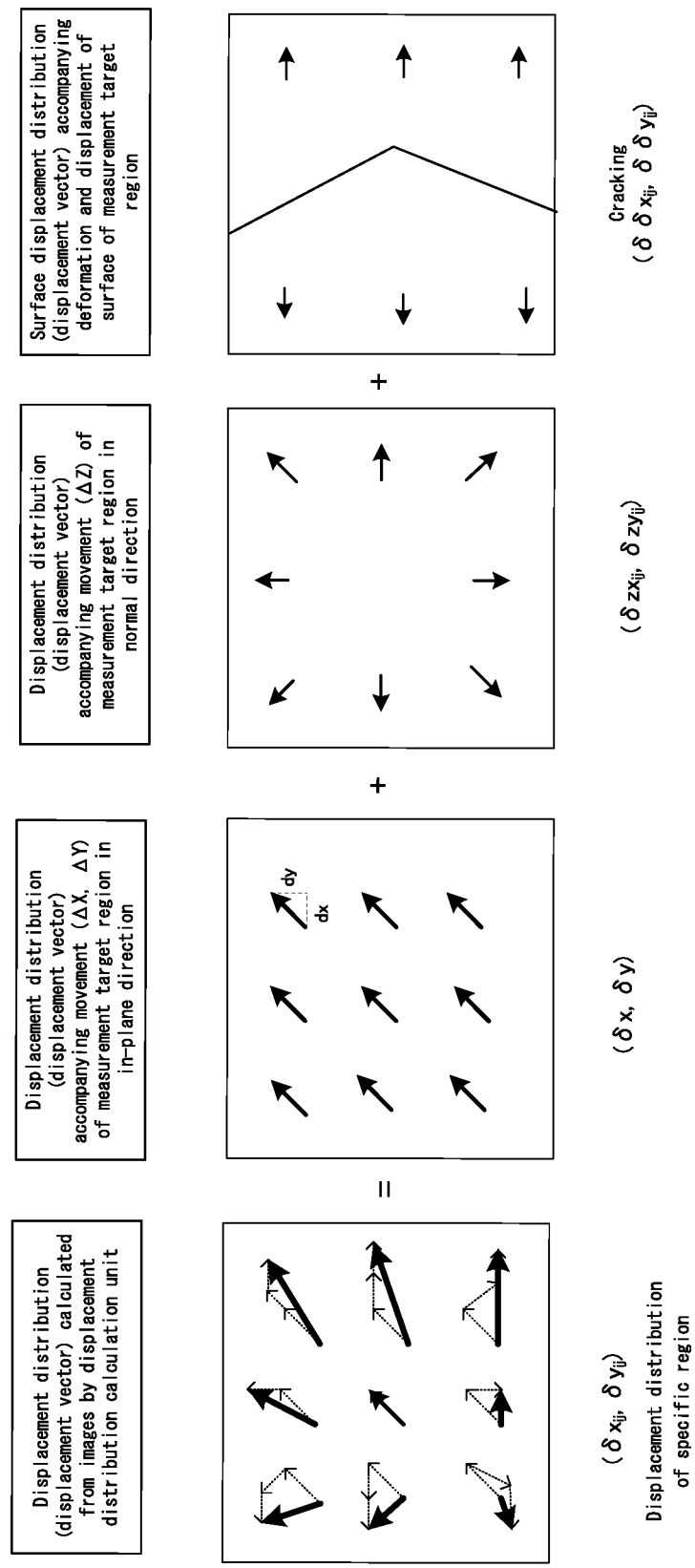
FIG. 5 is a diagram showing two-dimensional spatial distributions of displacement components that are observed in a specific region on an image shot of the measurement target region.

The displacement component ($\delta x_{ij}$, $\delta y_{ij}$) of the respective coordinates of the specific region calculated by the vibration measurement unit 21 as shown in FIG. 5, when shown as a displacement vector, can be represented as a composite component of the displacement component ($\delta x$, $\delta y$) accompanying the movement ($\Delta x$, $\Delta y$) in the plane direction that is observed in a uniform direction and size over the entire screen, the displacement component ($\delta z x_{ij}$, $\delta z y_{ij}$) accompanying the movement ($\Delta z$) in the normal direction that is observed as a vector group radiating from the image capturing center of the screen, and the surface displacement component ($\delta\delta x_{ij}$, $\delta\delta y_{ij}$) accompanying the deformation and displacement of the surface of the measurement target region.

Next, a method of calculating the displacement vector component ($\delta x$, $\delta y$) accompanying the movement ($\Delta x$, $\Delta y$) in the plane direction will be considered. As shown in FIG. 5, the displacement component ($\delta x$, $\delta y$) accompanying the movement ($\Delta x$, $\Delta y$) in the plane direction is basically a component that is observed in a uniform direction and size over the entire screen such as offset. In view of this, the displacement component measured at respective coordinates of a specific region centered on the image capturing center, from the displacement distribution calculated by the vibration measurement unit 21, is treated as a displacement vector obtained by adding plus or minus depending on the direction of the displacement. The displacement vectors of the respective coordinates that are targeted are all added together and an average is taken. The displacement vector component ($\delta x$, $\delta y$) accompanying the movement ($\Delta x$, $\Delta y$) in the in-plane direction can thereby be calculated.

This technique will be described in detail. First, when the displacement distribution is treated as a displacement vector component, as shown in FIG. 5, a displacement vector group composited of the displacement vector component ($\delta x$, $\delta y$) accompanying the movement ($\Delta x$, $\Delta y$) in the plane direction, the displacement vector component ($\delta z x_{ij}$, $\delta z y_{ij}$) accompanying the movement ($\Delta z$) in the normal direction, and the surface displacement component ($\delta\delta x_{ij}$, $\delta\delta y_{ij}$) is observed. Here, in a specific region centered on the image capturing center, the displacement vector component ($\delta z x_{ij}$, $\delta z y_{ij}$)

accompanying the movement (Δz) in the normal direction is observed as a radial displacement vector, as shown in FIG. 5.

Thus, when the displacement vectors of the respective pixels of the region centered on the image capturing center of the screen are all added together, the displacement vector component (δzx$_{ij}$, δzy$_{ij}$), which is a radial displacement vector component and occurs with the movement (δz) in the normal direction, will be canceled out. As a result, only the component obtained by adding together the displacement vector component (δx, δy) accompanying the movement (Δx, Δy) in the plane direction and the surface displacement component (δδx$_{ij}$, δδy$_{ij}$) remains.

Here, generally, the surface displacement component (δδx$_{ij}$, δδy$_{ij}$) caused by deformation and displacement that occur on the surface of a structure is often regarded as sufficiently small when compared with the displacement vector component (δx, δy) accompanying the movement (Δx, Δy) in the plane direction. Accordingly, since the component obtained by adding the surface displacement component (δδx$_{ij}$, δδy$_{ij}$) is much smaller than the component obtained by adding the displacement vector component (δx, δy) accompanying the movement (Δx, Δy) in the plane direction which is very small, that component can be disregarded. Thus, the majority of the remaining components can be regarded as being due to the displacement vector component (δx, δy) accompanying the movement (Δx, Δy) in the plane direction.

Accordingly, it becomes possible to calculate the displacement vector component (δx, δy) accompanying the movement (Δx, Δy) in the in-plane direction, by calculating an average for the remaining components. In other words, the displacement vector component (δx, δy) accompanying the movement (Δx, Δy) in the in-plane direction can be calculated by the abovementioned method.

Next, a method of calculating the displacement vector component (δzx$_{ij}$, δzy$_{ij}$) accompanying the movement (Δz) in the normal direction will be described. A state where only the displacement vector component (δzx$_{ij}$, δzy$_{ij}$) accompanying the movement (Δz) in the normal direction has occurred will be considered. A size R(i, j) of the vector thereof will be proportional to the distance from the image capturing center, as shown in the following equation 10, if the movement amount Δz of the specific region is constant within the specific region. Equation 10 can also be represented as in equation 12, if k is substituted for the constant of proportionality as shown in the following equation 11.

$$R(i, j) = \sqrt{\delta zx_{ij}^2 + \delta zy_{ij}^2} = f\left(\frac{1}{L - \Delta z} - \frac{1}{L}\right)\sqrt{i^2 + j^2} \quad \text{[Equation 10]}$$

$$k = f\left(\frac{1}{L - \Delta z} - \frac{1}{L}\right) \quad \text{[Equation 11]}$$

$$R(i,j) = k\sqrt{i^2 + j^2} \quad \text{[Equation 12]}$$

On the other hand, the displacement distribution calculated by the vibration measurement unit 21 is, as shown in FIG. 5, actually constituted by a composite vector component (δx$_{ij}$, δy$_{ij}$) (FIG. 5: extra-bold solid arrows). The composite vector component (δx$_{ij}$, δy$_{ij}$), as also evident from FIG. 5, includes the displacement vector component (δzx$_{ij}$, δzy$_{ij}$) (FIGS. 4, 5: intermediate solid arrows) accompanying the movement (Δz) in the normal direction, the displacement vector component (δx, δy) (FIGS. 4, 5: bold solid arrows) accompanying the movement (Δx, Δy) in the in-plane direction, and the surface displacement component (δδx$_{ij}$, δδy$_{ij}$) (FIGS. 4, 5: thin solid arrow) accompanying deformation and displacement of the surface of the measurement target region.

The result of subtracting the displacement vector component (δx, δy) accompanying the movement (Δx, Δy) in the in-plane direction previously calculated from this composite vector component (δx$_{ij}$, δy$_{ij}$) is equivalent to a composite vector of the displacement vector component (δzx$_{ij}$, δzy$_{ij}$) accompanying the movement (Δz) in the normal direction and the surface displacement component (δδx$_{ij}$, δδy$_{ij}$). Accordingly, if the composite vector of the displacement vector component (δzx$_{ij}$, δzy$_{ij}$) accompanying the movement (Δz) in the normal direction and the surface displacement component (δδx$_{ij}$, δδy$_{ij}$) at certain coordinates (i, j) is given as R$_{mes}$(i, j), these relationships can be represented as in the following equation 13 and the values thereof can be calculated.

$$R_{mes}(i,j) = \sqrt{(\delta xij - \delta x)^2 + (\delta yij - \delta y)^2}$$

$$R_{mes}(i,j) = \sqrt{(\delta zxij + \delta\delta xij)^2 + (\delta zyij + \delta\delta yij)^2} \quad \text{[Equation 13]}$$

Incidentally, the surface displacement component (δδx$_{ij}$, δδy$_{ij}$) is often regarded as sufficiently small when compared with the displacement vector component (δx, δy) accompanying the movement (Δx, Δy) in the in-plane direction and the displacement vector component (δzx$_{ij}$, δzy$_{ij}$) accompanying the movement (Δz) in the normal direction. Thus, the discussion will be continued here with a focus on the displacement vector component (δx, δy) accompanying the movement (Δx, Δy) in the in-plane direction and the displacement vector component (δzx$_{ij}$, δzy$_{ij}$) accompanying the movement (Δz) in the normal direction that are the dominant components. As such, equation 13 can be represented as equation 14.

$$R_{mes}(i,j) = \sqrt{(\delta xij - \delta x)^2 + (\delta yij - \delta y)^2} \quad \text{[Equation 14]}$$

In this case, R$_{mes}$(i, j) at the coordinates (i, j) can be treated as substantially equal to the displacement vector component (δzx$_{ij}$, δzy$_{ij}$) accompanying the movement (Δz) in the normal direction. At this time, the displacement vector component when the movement amount Δz in the normal direction is provided is represented by R(i, j) as in equations 11 to 13.

It thus becomes possible, with equation 14, to estimate the enlargement/reduction ratio of the size R(i, j) of the displacement vector resulting from the displacement vector component (δzx$_{ij}$, δzy$_{ij}$) accompanying the movement (Δz) in the normal direction, using the size R$_{mes}$(i, j) of the displacement vector derived from the displacement component (δx$_{ij}$, δy$_{ij}$) at the respective coordinates and the displacement vector component (δx, δy) accompanying the movement (Δx, Δy) in the in-plane direction that are calculated by the vibration measurement unit 21. Specifically, the scale factor of R(i, j) can be estimated by deriving a constant of proportionality k at which the valuation function E(k) shown in the following equation 15 is minimized.

$$E(k) = \sum_{i,j} \{R_{mes}(i, j) - R(i, j, k)\}^2 \quad \text{[Equation 15]}$$

Accordingly, in the present example embodiment, the vibration measurement unit 21 calculates the constant of proportionality k by applying a least-squares method to the above equation 15. Note that absolute value sums or other perfect powers or the like may be used as the evaluation function E(k), apart from the square sum of differences between $R_{mes}(i, j)$ and $R(i, j)$ shown in the above equation 15.

The vibration measurement unit 21 then calculates the movement amount $\Delta z$, by applying the calculated constant of proportionality k to the above equation 12, as a constant indicating the enlargement/reduction ratio. This enables the vibration measurement unit 21 to calculate the three-directional movement amounts $\Delta x$, $\Delta y$ and $\Delta z$ of the measurement target region.

The vibration measurement unit 21 is also able to calculate the movement amount of the measurement target region more accurately, using the calculated movement amounts $\Delta x$, $\Delta y$ and $\Delta z$ of the measurement target region. Specifically, the displacement vector component ($\delta zx_{ij}$, $\delta zy_{ij}$) accompanying the movement ($\Delta z$) in the normal direction is calculated by substituting the calculated movement amount $\Delta z$ into the above equation 9. Furthermore, the displacement vector component ($\delta x'$, $\delta y'$) accompanying the movement ($\Delta x$, $\Delta y$) in the in-plane direction is calculated, by subtracting the calculated displacement vector component ($\delta zx_{ij}$, $\delta zy_{ij}$) accompanying the movement ($\Delta z$) in the normal direction from the displacement vector ($\delta x_{ij}$, $\delta y_{ij}$) that is calculated as the displacement distribution by the vibration measurement unit 21 (see above equations 6 and 7).

Note that, here also, the surface displacement component ($\delta\delta x_{ij}$, $\delta\delta y_{ij}$) is calculated using the condition of regarding this surface displacement component as sufficiently small when compared with the displacement vector component ($\delta x$, $\delta y$) accompanying the movement ($\Delta x$, $\Delta y$) in the in-plane direction and the displacement vector component ($\delta zx_{ij}$, $\delta zy_{ij}$) accompanying the movement ($\Delta z$) in the normal direction.

Thereafter, the vibration measurement unit 21 calculates the movement amounts $\Delta x'$ and $\Delta y'$ of the measurement target region in the plane direction, by substituting the calculated displacement vector component ($\delta x'$, $\delta y'$) accompanying the movement amount in the plane direction and the movement amount $\Delta z$ into the above equation 8. The movement amounts $\Delta x'$ and $\Delta y'$ of the measurement target region in the plane direction thus calculated are calculated more accurately than the movement amounts $\Delta x$ and $\Delta y$ previously calculated.

Furthermore, it is also possible to calculate $\Delta z'$ by again applying the above equation 15, using the calculated movement amounts $\Delta x'$ and $\Delta y'$ of the measurement target region in two directions, and derive the movement amounts $\Delta x'$, $\Delta y'$ and $\Delta z'$ of the measurement target region in three directions. These values are calculated more accurately than when calculated as the movement amounts $\Delta x$, $\Delta y$ and $\Delta z$ and $\Delta x'$, $\Delta y'$ and $\Delta z'$. The above processing may be repeated a number of times determined in advance, or may be repeatedly performed until the calculated displacement values converge to a threshold.

Also, the movement amount of the measurement target region in the plane direction and the movement amount of the measurement target region in the normal direction that are calculated by the vibration measurement unit 21 are respectively obtained for every shot of the time-series images that are shot. In the second example embodiment, each movement amount can thus similarly be treated as a vibration waveform whose sampling interval is the time interval of shooting.

Also, in the second example embodiment, the reliability calculation unit 12 derives the surface displacement component that occurs due to deformation of the surface of the object 40 from the displacement distribution on the surface of the object 40, and calculates the reliability level, based on the derived surface displacement component.

Specifically, the reliability calculation unit 12 calculates the surface displacement component ($\delta\delta x_{ij}$, $\delta\delta y_{ij}$) of the measurement target region from the displacement distribution (displacement vector ($\delta x_{ij}$, $\delta y_{ij}$)), using the movement amount ($\Delta x$, $\Delta y$) of the measurement target region in the plane direction and the movement amount ($\Delta z$) of the measurement target region in the normal direction that are calculated by the vibration measurement unit 21.

According to FIG. 5, it is evident that, in order to calculate the surface displacement component ($\delta\delta x_{ij}$, $\delta\delta y_{ij}$), the displacement component that occurs due to the movement amount ($\Delta x$, $\Delta y$, $\Delta z$) of the measurement target region need only be subtracted from the displacement vector ($\delta x_{ij}$, $\delta y_{ij}$) calculated by the vibration measurement unit 21. In other words, the surface displacement component ($\delta\delta x_{ij}$, $\delta\delta y_{ij}$) can be calculated by using the following equations 16 and 17.

[surface displacement component ($\delta\delta x_{ij}$,$\delta\delta y_{ij}$)]=[displacement vector ($\delta x_{ij}$,$\delta y_{ij}$) calculated by vibration measurement unit 21][displacement component ($\delta x$,$\delta y$) accompanying movement ($\Delta x$,$\Delta y$) in plane direction][displacement component ($\delta zx_{ij}$, $\delta zy_{ij}$) accompanying movement ($\Delta z$) in normal direction]   [Equation 16]

($\delta\delta x_{ij}$,$\delta\delta y_{ij}$)=($\delta x_{ij}$-($\delta x_{ij}$=$\delta zx_{ij}$),-($\delta y$+$\delta zy_{ij}$))   [Equation 17]

According to the above equations 16 and 17, the displacement vector component ($\delta x$, $\delta y$) accompanying the movement ($\Delta x$, $\Delta y$) in the in-plane direction and the displacement vector component ($\delta zx_{ij}$, $\delta zy_{ij}$) accompanying the movement ($\Delta z$) in the normal direction need only be subtracted from the displacement vector ($\delta x_{ij}$, $\delta y_{ij}$) calculated by the vibration measurement unit 21.

Accordingly, the reliability calculation unit 12 calculates, for every pixel in the processing image, the displacement vector component ($\delta x$, $\delta y$) accompanying the movement ($\Delta x$, $\Delta y$) in the in-plane direction and the displacement vector component ($\delta zx_{ij}$, $\delta zy_{ij}$) accompanying the movement ($\Delta z$) in the normal direction, using the movement amount ($\Delta x$ $\Delta y$, $\Delta z$) of the measurement target region calculated by the vibration measurement unit 21.

The reliability calculation unit 12 then subtracts each displacement vector component from the displacement vector ($\delta x_{ij}$, $\delta y_{ij}$) calculated by the vibration measurement unit 21. The displacement distribution ($\delta x_{ij}$, $\delta y_{ij}$) calculated by the vibration measurement unit 21 will thereby be corrected for the surface displacement component that occurs due to the movement amount of the measurement target region, and only the surface displacement component in the measurement target region will be obtained.

Also, the surface displacement component of the measurement target region occurs markedly in cases such as where the surface deforms due to the occurrence of stress and strain, such as when there are cracks or the like in the surface of the object 40, for example. This surface displacement component will be a noise component, when calculating the displacement component accompanying the movement amount ($\Delta x$, $\Delta y$) of the measurement target region in the in-plane direction and the movement amount ($\Delta z$) of the measurement target region in the normal direction. Thus, by quantitatively evaluating the surface displacement component of the measurement target region, the calculated movement amount (Δx, Δy, Δz) of the measurement target region, that is, the reliability level of the vibration waveform of the object 40, can be evaluated.

The reliability calculation unit 12, in the second example embodiment, thus calculates an average value $S_{mn}$ of the absolute value (size) of the surface displacement vector of the measurement target region using the following equation 18, and calculates the reliability level based on that average value, for example. Also, in the following equation 18, m and n each indicate the size of the measurement target region.

$$S_{mn} = \frac{1}{mn} \sum_{i=1,j=1}^{m,n} \left( \sqrt{(\delta\delta x_{ij}^2 + \delta\delta y_{ij}^2)} \right)$$ [Equatioin 18]

Here, the case where the value of $S_{mn}$ is small, that is, the average value of the absolute value (size) of the surface displacement vector is small, indicates that the movement amount was appropriately calculated, and there are few remaining components of surface displacement (deformation and displacement) of the measurement target region. Thus, the calculation of the movement amount can be judged to have a high level of reliability. Accordingly, if the value of $S_{mn}$ is less than or equal to a threshold value determined in advance, the reliability calculation unit 12 judges that the reliability level is high, and calculates a high value for the reliability level.

On the other hand, if the value of $S_{mn}$ is larger than the threshold value determined in advance, the calculation of the movement amount can be judged to have a low level of reliability. Accordingly, in this case, the reliability calculation unit 12 judges that the reliability level is low, and calculates a low value for the reliability level. Also, in this case, the vibration measurement unit 21 may calculate the vibration waveform again. Furthermore, in this case, the measurement target region may be changed, and calculation of the vibration waveform by the vibration measurement unit 21 may be performed again.

In the second example embodiment, the reliability calculation unit 12 is also able to calculate the reliability level, based on distribution or standard deviation, which are indicators of variability in the components of the surface displacement vector. A large variability in the surface displacement vector indicates that the surface displacement vector within the region is small, and thus, in this case, the reliability calculation unit 12 judges that the reliability level is high, and calculates a high value for the reliability level. The following equations 19 and 20 are distribution calculation equations, and the equations 21 and 22 are standard deviation calculation equations.

$$\sigma_x^2 = \frac{1}{mn} \sum_{i=1,j=1}^{m,n} (\delta\delta x_{ij} - \delta\delta x_{ijavg})^2$$ [Equation 19]

$$\sigma_y^2 = \frac{1}{mn} \sum_{i=1,j=1}^{m,n} (\delta\delta y_{ij} - \delta\delta y_{ijavg})^2$$ [Equation 20]

$$\sigma_x = \sqrt{\frac{1}{mn} \sum_{i=1,j=1}^{m,n} (\delta\delta x_{ij} - \delta\delta x_{ijavg})^2}$$ [Equation 21]

$$\sigma_y = \sqrt{\frac{1}{mn} \sum_{i=1,j=1}^{m,n} (\delta\delta y_{ij} - \delta\delta y_{ijavg})^2}$$ [Equation 22]

[Apparatus Operations]

Next, operations of the vibration reliability calculation apparatus in the second example embodiment of the invention will be described using FIG. 6. FIG. 6 is a flow diagram showing operations of the vibration reliability calculation apparatus in the second example embodiment of the invention. Also, in the second example embodiment, FIGS. 1 and 2 will similarly be referred to appropriate in the following description. Furthermore, in the second example embodiment, the vibration reliability calculation method is similarly implemented by operating the vibration reliability calculation apparatus. Therefore, the following description of the operations of the vibration reliability calculation apparatus will be given in place of a description of the vibration reliability calculation method in the second example embodiment.

Figure 6:
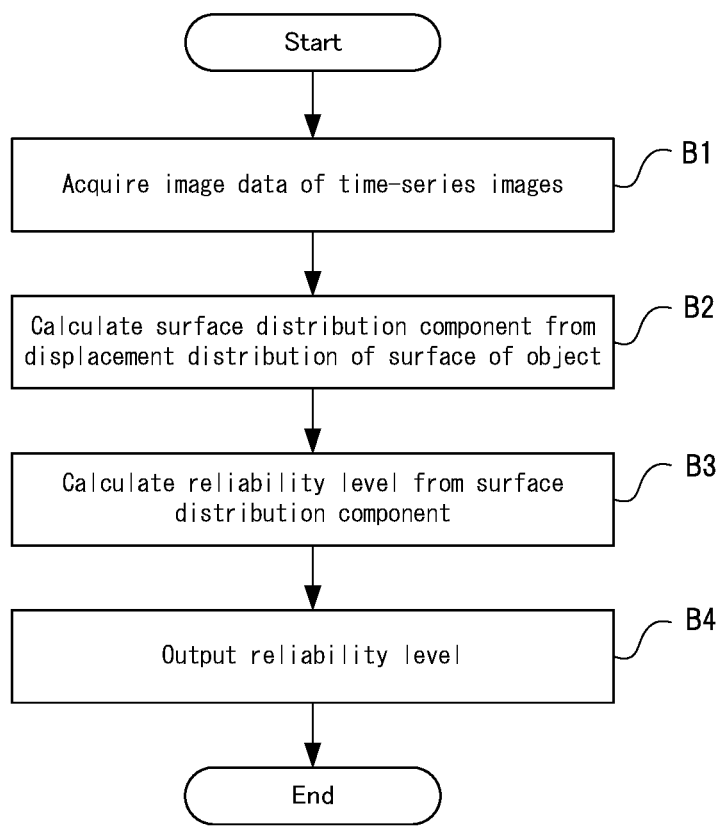
FIG. 6 is a flow diagram showing operations of the vibration reliability calculation apparatus in a second example embodiment of the invention.

As shown in FIG. 6, initially, in the vibration reliability calculation apparatus, the image acquisition unit 11 acquires the image data of time-series images shot of the measurement target region of the object 40 that is output by the image capturing apparatus 30 (step B1).

Upon step B1 being executed, the vibration measurement unit 21, in the vibration measurement apparatus 20, calculates the distributions of the displacement of a specific region which is a region including the measurement target region within the image data in the plane direction and the normal direction, using the image data of the time-series images acquired in step B1. Furthermore, the vibration measurement unit 21 derives the movement amount of the object 40 in each direction, that is, the vibration waveform of the object 40, from the displacement distributions of the specific region in the plane direction and the normal direction for every processing image in the time-series images.

Next, upon the vibration waveform being derived by the vibration measurement unit 21, the reliability calculation unit 12 calculates the surface displacement component that occurs due to deformation of the surface of the object 40 from the displacement distribution on the surface of the object 40 (step B2). Furthermore, the reliability calculation unit 12 calculates the reliability level of the vibration waveform measured by the vibration measurement unit 21, from the surface displacement component derived in step B2 (step B3).

Next, the reliability calculation unit 12 externally outputs the reliability level calculated in step B3 (step B4). As a result, the calculated reliability level is, for example, displayed on the screen of a display device that is connected to the vibration measurement apparatus 20.

As described above, in the second example embodiment, the reliability level is similarly calculated for the vibration waveform derived from the time-series images by the vibration measurement apparatus 20, and the result is presented to the user of the vibration measurement apparatus 20. The user is thus able to evaluate the reliability of the vibration waveform, based on the presented reliability level.

[Program]

The program in the second example embodiment need only be a program that causes a computer to execute steps B1 to B4 shown in FIG. 6. The vibration reliability calculation apparatus and the vibration reliability calculation method in the second example embodiment can be realized by this program being installed on a computer and executed. In this case, a processor of the computer performs processing while functioning as the image acquisition unit 11 and the reliability calculation unit 12.

Also, the program in the second example embodiment may be executed by a computer system built from a plurality of computers. In this case, for example, the computers may each function as one of the image acquisition unit 11 and the reliability calculation unit 12.

[Physical Configuration]

Figure 7:
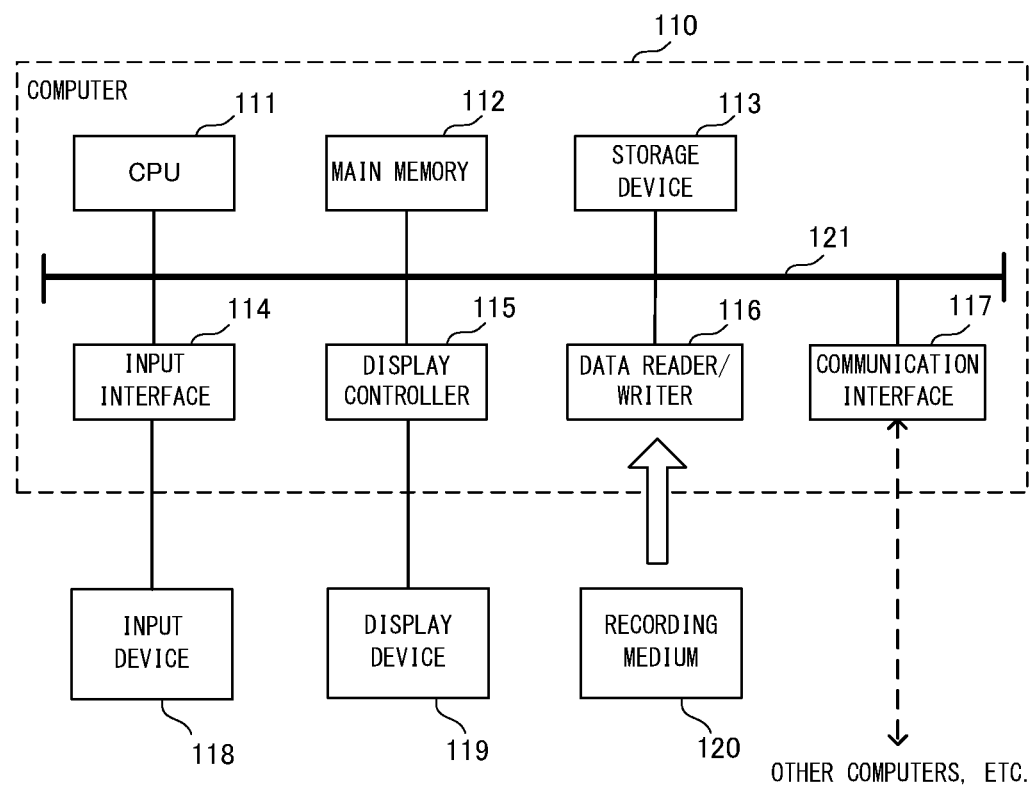
FIG. 7 is a block diagram showing an example of a computer that realizes the vibration reliability calculation apparatus in the example embodiments of the invention.

Here, a computer that realizes a vibration reliability calculation apparatus by executing a program of the first and second example embodiments will be described using FIG. 7. FIG. 7 is a block diagram showing an example of a computer that realizes the vibration reliability calculation apparatus of the example embodiments of the invention.

As shown in FIG. 7, a computer 110 includes a CPU 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting program (codes) of the example embodiments that are stored in the storage device 113 to the main memory 112, and executing these codes in predetermined order. The main memory 112, typically, is a volatile storage device such as a DRAM (Dynamic Random Access Memory). Also, programs of the example embodiments are provided in a state of being stored in a computer readable recording medium 120. Note that programs according to the example embodiments may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the vibration reliability calculation apparatus of the example embodiments is also realizable by using hardware corresponding to the respective constituent elements, rather than by a computer on which programs are installed. Furthermore, the vibration reliability calculation apparatus may be realized in part by programs, and the remaining portion may be realized by hardware.

The example embodiments described above can be partially or wholly realized by supplementary notes 1 to 16 described below, although the invention is not limited to the following description.

(Supplementary Note 1)

A vibration reliability calculation apparatus including:

an image acquisition unit configured to acquire time-series images of an object that are output by an image capturing apparatus that shoots the object; and a reliability calculation unit configured to calculate, for a vibration waveform of the object that is derived from a result of comparing one image and another image that constitute the acquired time-series images, a reliability level indicating a reliability of the vibration waveform.

(Supplementary Note 2)

The vibration reliability calculation apparatus according to supplementary note 1, wherein in a case where the vibration waveform of the object is derived based on a movement amount of a specific region within each image that is obtained by comparing one image and another image that constitute the time-series images, the reliability calculation unit calculates the reliability level, based on a similarity between the specific region in the one image and the specific region in the other image.

(Supplementary Note 3)

The vibration reliability calculation apparatus according to supplementary note 2, wherein in a case where the movement amount of the specific region is obtained from a first similarity correlation function in a direction parallel to a shooting surface of the object and a second similarity correlation function in a normal direction of the shooting surface of the object, the reliability calculation unit calculates the reliability level, based on the first similarity correlation function and the second similarity correlation function, by weighting the first similarity correlation function more than the second similarity correlation function.

(Supplementary Note 4)

The vibration reliability calculation apparatus according to supplementary note 1, wherein in a case where the vibration waveform of the object is calculated using a displacement distribution on a surface of the object that is derived from the time-series images, the reliability calculation unit derives a surface displacement component that occurs due to deformation of the surface of the object, from the displacement distribution on the surface of the object, and calculates the reliability level, based on the derived surface displacement component.

(Supplementary Note 5)

A vibration measurement apparatus including:

an image acquisition unit configured to acquire time-series images of an object that are output by an image capturing apparatus that shoots the object;

a vibration measurement unit configured to measure a vibration waveform of the object, using the acquired time-series images; and a reliability calculation unit configured to compare one image and another image that constitute the acquired time-series images, and calculate a reliability level indicating a reliability of the vibration waveform of the object measured by the vibration measurement unit.

(Supplementary Note 6)

The vibration measurement apparatus according to supplementary note 5, wherein the vibration measurement unit measures the vibration waveform of the object, based on a movement amount of a specific region within each image that is obtained by comparing one image and another image that constitute the time-series images, and the reliability calculation unit calculates the reliability level, based on a similarity between the specific region within the one image and the specific region within the other image.

(Supplementary Note 7)

The vibration measurement apparatus according to supplementary note 6, wherein the vibration measurement unit calculates the movement amount of the specific region from a first similarity correlation function in a direction parallel to a shooting surface of the object and a second similarity correlation function in a normal direction of the shooting surface of the object, and measures the vibration waveform of the object, based on the calculated movement amount of the specific region, and the reliability calculation unit calculates the reliability level, based on the first similarity correlation function and the second similarity correlation function, by weighting the first similarity correlation function more than the second similarity correlation function.

(Supplementary Note 8)

The vibration measurement apparatus according to supplementary note 5, wherein the vibration measurement unit measures the vibration waveform of the object, using a displacement distribution on a surface of the object that is derived from the time-series images, and the reliability calculation unit derives a surface displacement component that occurs due to deformation of the surface of the object, from the displacement distribution on the surface of the object, and calculates the reliability level, based on the derived surface displacement component.

(Supplementary Note 9)

A vibration reliability calculation method including:

(a) a step of acquiring time-series images of an object that are output by an image capturing apparatus that shoots the object; and (b) a step of calculating, for a vibration waveform of the object that is derived from a result of comparing one image and another image that constitute the acquired time-series images, a reliability level indicating a reliability of the vibration waveform.

(Supplementary Note 10)

The vibration reliability calculation method according to supplementary note 9, wherein in a case where the vibration waveform of the object is derived based on a movement amount of a specific region within each image that is obtained by comparing one image and another image that constitute the time-series images, in the (b) step, the reliability level is calculated, based on a similarity between the specific region in the one image and the specific region in the other image.

(Supplementary Note 11)

The vibration reliability calculation method according to supplementary note 10, wherein in a case where the movement amount of the specific region is obtained from a first similarity correlation function in a direction parallel to a shooting surface of the object and a second similarity correlation function in a normal direction of the shooting surface of the object, in the (b) step, the reliability level is calculated, based on the first similarity correlation function and the second similarity correlation function, by weighting the first similarity correlation function more than the second similarity correlation function.

(Supplementary Note 12)

The vibration reliability calculation method according to supplementary note 9, wherein in a case where the vibration waveform of the object is calculated using a displacement distribution on a surface of the object that is derived from the time-series images, in the (b) step, a surface displacement component that occurs due to deformation of the surface of the object is derived from the displacement distribution on the surface of the object, and the reliability level is calculated, based on the derived surface displacement component.

(Supplementary Note 13)

A computer readable recording medium that includes a program recorded thereon, the program including instructions that cause a computer to carry out:

(a) a step of acquiring time-series images of an object that are output by an image capturing apparatus that shoots the object; and (b) a step of calculating, for a vibration waveform of the object that is derived from a result of comparing one image and another image that constitute the acquired time-series images, a reliability level indicating a reliability of the vibration waveform.

(Supplementary Note 14)

The computer readable recording medium according to supplementary note 13, wherein in a case where the vibration waveform of the object is derived based on a movement amount of a specific region within each image that is obtained by comparing one image and another image that constitute the time-series images, in the (b) step, the reliability level is calculated, based on a similarity between the specific region in the one image and the specific region in the other image.

(Supplementary Note 15)

The computer readable recording medium according to supplementary note 14, wherein in a case where the movement amount of the specific region is obtained from a first similarity correlation function in a direction parallel to a shooting surface of the object and a second similarity correlation function in a normal direction of the shooting surface of the object, in the (b) step, the reliability level is calculated, based on the first similarity correlation function and the second similarity correlation function, by weighting the first similarity correlation function more than the second similarity correlation function.

(Supplementary Note 16)

The computer readable recording medium according to supplementary note 13, wherein in a case where the vibration waveform of the object is calculated using a displacement distribution on a surface of the object that is derived from the time-series images, in the (b) step, a surface displacement component that occurs due to deformation of the surface of the object is derived from the displacement distribution on the surface of the object, and the reliability level is calculated, based on the derived surface displacement component.

Although the invention of the present application has been described above with reference to example embodiments, the invention is not limited to the above example embodiments. Various modifications apparent to those skilled in the art can be made to the configurations and details of the invention of the present application within the scope of the invention.

INDUSTRIAL APPLICABILITY

As described above, according to the invention, in non-contact measurement of a vibration waveform, particularly measurement of the vibration waveform of an object using images, the reliability of the vibration waveform can be evaluated, even in the case where reliability cannot be adequately evaluated with conventional techniques. The invention is useful in various fields in which non-contact measurement of vibration waveforms is sought.

LIST OF REFERENCE SIGNS

10 Vibration reliability calculation apparatus
11 Image acquisition unit
12 Reliability calculation unit
20 Vibration measurement apparatus
21 Vibration measurement unit
30 Image capturing apparatus
40 Object
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A vibration reliability calculation apparatus comprising:
   a memory storing instructions; and
   at least one hardware processor configured to execute the instructions to implement:
      an image acquisition unit configured to acquire time-series images of an object that are output by an image capturing apparatus; and
      a reliability calculation unit configured to calculate, for a vibration waveform of the object that is derived from a result of comparing one image and another image that constitute the acquired time-series images, a reliability level indicating a reliability of the vibration waveform,
   wherein, in a case where the vibration waveform of the object is calculated using a displacement distribution on a surface of the object that is derived from the time-series images, the reliability calculation unit derives a surface displacement component a of measurement target region that occurs due to deformation of the surface of the object, from the displacement distribution on the surface of the object, and calculates the reliability level, based on the derived surface displacement component, and
   wherein, in the case where the vibration waveform of the object is calculated using a displacement distribution on a surface of the object that is derived from the time-series images, the reliability calculation unit is further configured to calculate an average value of absolute values of a surface displacement vector constituting the surface displacement component of the measurement target region, and to calculate the reliability level based on the calculated average value.

2. The vibration reliability calculation apparatus according to claim 1, wherein, in a case where the vibration waveform of the object is derived based on a movement amount of a specific region within each image that is obtained by comparing one image and another image that constitute the time-series images, the reliability calculation unit calculates the reliability level, based on a similarity between the specific region in the one image and the specific region in the other image.

3. The vibration reliability calculation apparatus according to claim 2, wherein, in a case where the movement amount of the specific region is obtained from a first similarity correlation function in a direction parallel to a shooting surface of the object and a second similarity correlation function in a normal direction of the shooting surface of the object, the reliability calculation unit calculates the reliability level, based on the first similarity correlation function and the second similarity correlation function, by weighting the first similarity correlation function more than the second similarity correlation function.

4. A vibration reliability calculation method implemented by a computer, the vibration reliability calculation method comprising:
   an acquiring of time-series images of an object that are output by an image capturing apparatus; and
   a calculating, for a vibration waveform of the object that is derived from a result of comparing one image and another image that constitute the acquired time-series images, of a reliability level indicating a reliability of the vibration waveform,
   wherein, in a case where the vibration waveform of the object is calculated using a displacement distribution on a surface of the object that is derived from the time-series images, in the calculating, a surface displacement component that occurs due to deformation of the surface of the object is derived from the displacement distribution on the surface of the object, and the reliability level is calculated, based on the derived surface displacement component, and
   wherein, in the case where the vibration waveform of the object is calculated using a displacement distribution on a surface of the object that is derived from the time-series images, the calculating further comprises calculating an average value of absolute values of a surface displacement vector constituting the surface displacement component of the measurement target region, and calculating the reliability level based on the calculated average value.

5. The vibration reliability calculation method according to claim 4, wherein, in a case where the vibration waveform of the object is derived based on a movement amount of a specific region within each image that is obtained by comparing one image and another image that constitute the time-series images, in the calculating, the reliability level is calculated, based on a similarity between the specific region in the one image and the specific region in the other image.

6. The vibration reliability calculation method according to claim 5, wherein, in a case where the movement amount of the specific region is obtained from a first similarity correlation function in a direction parallel to a shooting surface of the object and a second similarity correlation function in a normal direction of the shooting surface of the object, in the calculating, the reliability level is calculated, based on the first similarity correlation function and the second similarity correlation function, by weighting the first similarity correlation function more than the second similarity correlation function.

7. A non-transitory computer readable recording medium that includes a program recorded thereon, the program including instructions configured to cause a computer to carry out:

an acquiring of time-series images of an object that are output by an image capturing apparatus; and a calculating, for a vibration waveform of the object that is derived from a result of comparing one image and another image that constitute the acquired time-series images, of a reliability level indicating a reliability of the vibration waveform, wherein, in a case where the vibration waveform of the object is calculated using a displacement distribution on a surface of the object that is derived from the time-series images, in the calculating, a surface displacement component that occurs due to deformation of the surface of the object is derived from the displacement distribution on the surface of the object, and the reliability level is calculated, based on the derived surface displacement component, and wherein, in the case where the vibration waveform of the object is calculated using a displacement distribution on a surface of the object that is derived from the time-series images, the calculating further comprises calculating an average value of absolute values of a surface displacement vector constituting the surface displacement component of the measurement target region, and calculating the reliability level based on the calculated average value.

8. The non-transitory computer readable recording medium according to claim 7, wherein, in a case where the vibration waveform of the object is derived based on a movement amount of a specific region within each image that is obtained by comparing one image and another image that constitute the time-series images, in the calculating, the reliability level is calculated, based on a similarity between the specific region in the one image and the specific region in the other image.

9. The non-transitory computer readable recording medium according to claim 8, wherein, in a case where the movement amount of the specific region is obtained from a first similarity correlation function in a direction parallel to a shooting surface of the object and a second similarity correlation function in a normal direction of the shooting surface of the object, in the calculating, the reliability level is calculated, based on the first similarity correlation function and the second similarity correlation function, by weighting the first similarity correlation function more than the second similarity correlation function.

\* \* \* \* \*